US010744717B2

(12) United States Patent
Gottschalk-Gaudig

(10) Patent No.: US 10,744,717 B2
(45) Date of Patent: *Aug. 18, 2020

(54) METHOD FOR PRODUCING MOLDED BODIES

(71) Applicant: Wacker Chemie AG, Munich (DE)

(72) Inventor: Torsten Gottschalk-Gaudig, Mehring (DE)

(73) Assignee: WACKER CHEMIE AG, Munich (DE)

( * ) Notice: Subject to any disclaimer, the term of this patent is extended or adjusted under 35 U.S.C. 154(b) by 275 days.

This patent is subject to a terminal disclaimer.

(21) Appl. No.: 15/554,588

(22) PCT Filed: Nov. 13, 2015

(86) PCT No.: PCT/EP2015/076593
§ 371 (c)(1),
(2) Date: Aug. 30, 2017

(87) PCT Pub. No.: WO2017/020971
PCT Pub. Date: Feb. 9, 2017

(65) Prior Publication Data
US 2018/0036953 A1  Feb. 8, 2018

(30) Foreign Application Priority Data

Aug. 4, 2015 (DE) .................. 10 2015 214 883

(51) Int. Cl.
*B29C 64/40* (2017.01)
*B29C 64/112* (2017.01)
(Continued)

(52) U.S. Cl.
CPC ............ *B29C 64/40* (2017.08); *B29C 64/112* (2017.08); *B33Y 10/00* (2014.12); *B33Y 70/00* (2014.12);
(Continued)

(58) Field of Classification Search
CPC ................. B29C 64/40; B29C 64/112; B29K 2105/0094; B29K 2071/00
See application file for complete search history.

(56) References Cited

U.S. PATENT DOCUMENTS 5,851,715 A   12/1998   Barthel et al.
7,368,484 B2   5/2008   Levy
(Continued)

FOREIGN PATENT DOCUMENTS

DE   102013226494 A1   6/2015
EP     0686676 A1    12/1995
(Continued)

OTHER PUBLICATIONS

Sears, G.W. et al., "Determination of Specific Surface Area of Colloidal Silica by Titration with Sodium Hydroxide," Analytical Chemistry, Dec. 1956, pp. 1981-1983, vol. 28, No. 12, Wilmington, DE, U.S. (3 Pages).
(Continued)

*Primary Examiner* — Michael H. Wilson
*Assistant Examiner* — Jennifer A Kessie
(74) *Attorney, Agent, or Firm* — Brooks Kushman P.C.

(57) ABSTRACT

3D moldings are prepared by applying a viscoelastic supportive material comprising a polyether and a particulate rheological additive in at least some positions where a curable structure forming material is not desired, and following completion of the molding, the supportive material is removed.

10 Claims, 4 Drawing Sheets

(51) Int. Cl.
*C08K 3/34* (2006.01)
*C08K 3/36* (2006.01)
*C08K 9/06* (2006.01)
*B29K 71/00* (2006.01)
*B29K 105/00* (2006.01)
*B29K 509/08* (2006.01)
*B33Y 70/00* (2020.01)
*B33Y 10/00* (2015.01)

(52) U.S. Cl.
CPC ............... *C08K 3/34* (2013.01); *C08K 3/36* (2013.01); *C08K 9/06* (2013.01); *B29K 2071/00* (2013.01); *B29K 2105/0094* (2013.01); *B29K 2509/08* (2013.01); *B29K 2995/0093* (2013.01)

(56) References Cited

U.S. PATENT DOCUMENTS

| | | | |
|---|---|---|---|
| 7,951,848 B2* | 5/2011 | Gottschalk-Gaudig | B82Y 30/00 516/81 |
| 8,333,946 B2 | 12/2012 | Gottschalk-Gaudig et al. | |
| 9,617,428 B2 | 4/2017 | Schneider et al. | |
| 2005/0053798 A1* | 3/2005 | Maekawa | B29C 64/40 428/542.8 |
| 2013/0337277 A1* | 12/2013 | Dikovsky | B33Y 70/00 428/474.7 |
| 2015/0028523 A1 | 1/2015 | Jaker et al. | |
| 2017/0239886 A1 | 8/2017 | Norikane | |

FOREIGN PATENT DOCUMENTS

| | | |
|---|---|---|
| EP | 1433749 A1 | 6/2004 |
| JP | 2015128884 A2 | 7/2015 |
| JP | 2015136895 A2 | 7/2015 |
| WO | 2015/105047 A1 | 7/2015 |

OTHER PUBLICATIONS

T. Mezger, G., The Rheology Handbook, 2. ed., Vincentz Network GmbH & Co. KG; Germany, 2006, 147ff.

A. Gebhardt, Generative Fertigungsverfahren, Additive Manufacturing und 3D Drucken far Prototyping—Tooling—Produktion, 4. Aufl., Carl Hanser Verlag, München 2013, Germany.

* cited by examiner

METHOD FOR PRODUCING MOLDED BODIES

CROSS REFERENCE TO RELATED APPLICATIONS

This application is the U.S. National Phase of PCT Appln. No. PCT/EP2015/076593 filed Nov. 13, 2015, which claims priority to German Application No. 10 2015 214 883.1 filed Aug. 4, 2015, the disclosures of which are incorporated in their entirety by reference herein.

BACKGROUND OF THE INVENTION

1. Field of the Invention

The invention relates to a generative process for the manufacturing of three-dimensional mouldings which is characterized in that the moulding is constructed stepwise by site-specific delivery of the structure-forming material in a liquid form, where a second material is additionally delivered as supportive material into regions which are intended to remain free from the structure-forming material, and is removed once the structure-forming material has been solidified.

2. Description of the Related Art

Generative manufacturing processes are available for numerous materials and combinations of these (e.g. metals, plastics, ceramics, glasses).

Various processing methods are available for the manufacturing of mouldings via site-specific delivery of a liquid structure-forming material (sfm).

When an sfm has high viscosity or is a paste it can be delivered and deposited site-specifically in the form of a bead by means of a nozzle. Delivery through the nozzle can be achieved by way of example by using pressure or by using an extruder. A typical example of this processing method is 3D filament printing. Another known method is based on ballistic metering of small quantities of sfm in the form of droplets which are dispensed site-specifically by means of pressure heads. When low-viscosity inks are used that exhibit no, or hardly any, shear-thinning the method is termed "ink-jet printing," and when higher-viscosity materials are used that exhibit shear-thinning the term "jetting" is commonly used.

A precondition for all generative manufacturing methods is the representation of the geometry, and also optionally other properties (colour, material composition), of the desired moulding in the form of a digital 3D data set which can be regarded as a virtual model of the moulding (A. Gebhardt, Generative Fertigungsverfahren, [Generative Manufacturing Methods] Carl Hanser Verlag, Munich 2013). This modelling is preferably achieved by means of various 3D CAD methods (computer-aided design). Input data for the generation of a 3D CAD model can also comprise the 3D measurement data resulting by way of example from CT (Computer Tomography) measurements or MRT (Magnet Resonance Tomography) methods. The 3D CAD data set must then be supplemented by material-, process- and plant-specific data, and this is achieved by exporting the data set in a suitable format (e.g. STL, CLI/SLC, PLY, VRML, AMF format) by way of an interface; to Additive Manufacturing Software. This software finally uses the geometric information to generate virtual individual layers (slices), while taking into account the ideal orientation of the component in the construction chambert supportive structures, etc. The complete data set can then be used for direct control of the machine (3D printer) used for the generative manufacturing process.

The software sequence is as follows:
1. Design of the component in CAD format
2. Export info the STL data format
3. Division of the 3D model into layers parallel to the plane of printing and generation of the G-code
4. Export of the G-code to the printer control system.

A feature common to all generative manufacturing methods with site-specific delivery of the sfm is the need for supportive structures in regions of cavities, undercuts and overhangs, because site-specific delivery of sfm always requires a supportive surface prior to hardening of the sfm. Appropriate supportive materials (sm) for generating supportive structures are known.

US 2015/0028523 A1 describes the use of a thermoplastic polymer based on polyglycolic acid as an sm for filament printing. It is disadvantageous here that the thermoplastic sm must be heated to high temperatures of 200° C. and higher, and removal of the sm requires, by way of example, use of aqueous alkaline solution.

US 2013/033727 A1 describes the use of radiation-crosslinking block copolymers, for example based on acrylated polyethylene glycol-polycaprolactone block copolymers, as a temporary sm. The radiation crosslinking in the presence of water produces hydrogels, which can be removed via enzyme decomposition. It was found that formation of the chemical gels via crosslinking is slow, the enzymatic degradation is time-consuming, and a precondition for the latter is appropriate storage of the lipases used. Hydrogels moreover have the inherent disadvantage that water can evaporate during the construction of the intended structure, and shrinkage of the supportive structure can thus occur.

This problem also occurs with hydrogels based on particulate gel-formers such as phyllosilicates and silicas: experiments with aqueous dispersions of bentonites showed that adequately stable gels can be produced which initially provide suitable supportive structures. However, during the printing process, which can sometimes take some hours, loss of shape can occur as a result of evaporation of water.

U.S. Pat. No. 7,368,484 describes the use of Reverse Thermal Gelation to form supportive structures. This utilizes the reversible formation of gel from copolymers exposed to temperature increase. However, the strength of these gels is not adequate, and partial radiation crosslinking is therefore also required, making the subsequent removal of the supportive structures more difficult.

Overall, it can be stated that no method disclosed in the prior art is suitable for simple production of supportive structures for generative manufacturing methods with site-specific delivery of the sfm, where the supportive structures can in turn be removed without difficulty.

SUMMARY OF THE INVENTION

It was therefore an object of the present invention to provide a generative (=additive) process for the production of 3-dimensional mouldings which permits not only site-specific delivery of the structure-forming material (sfm) but also simple and inexpensive site-specific construction of supportive structures made of supportive material (sm) and, in turn, removal of the same. The sm here is intended to develop its supportive properties rapidly, to retain the supportive properties during the process, and then in turn be removed easily, without damage to the moulding or adverse effect on the properties thereof. These and other objects are achieved via the process of the invention.

DETAILED DESCRIPTION OF TBS PREFERRED EMBODIMENTS

Figure 1:
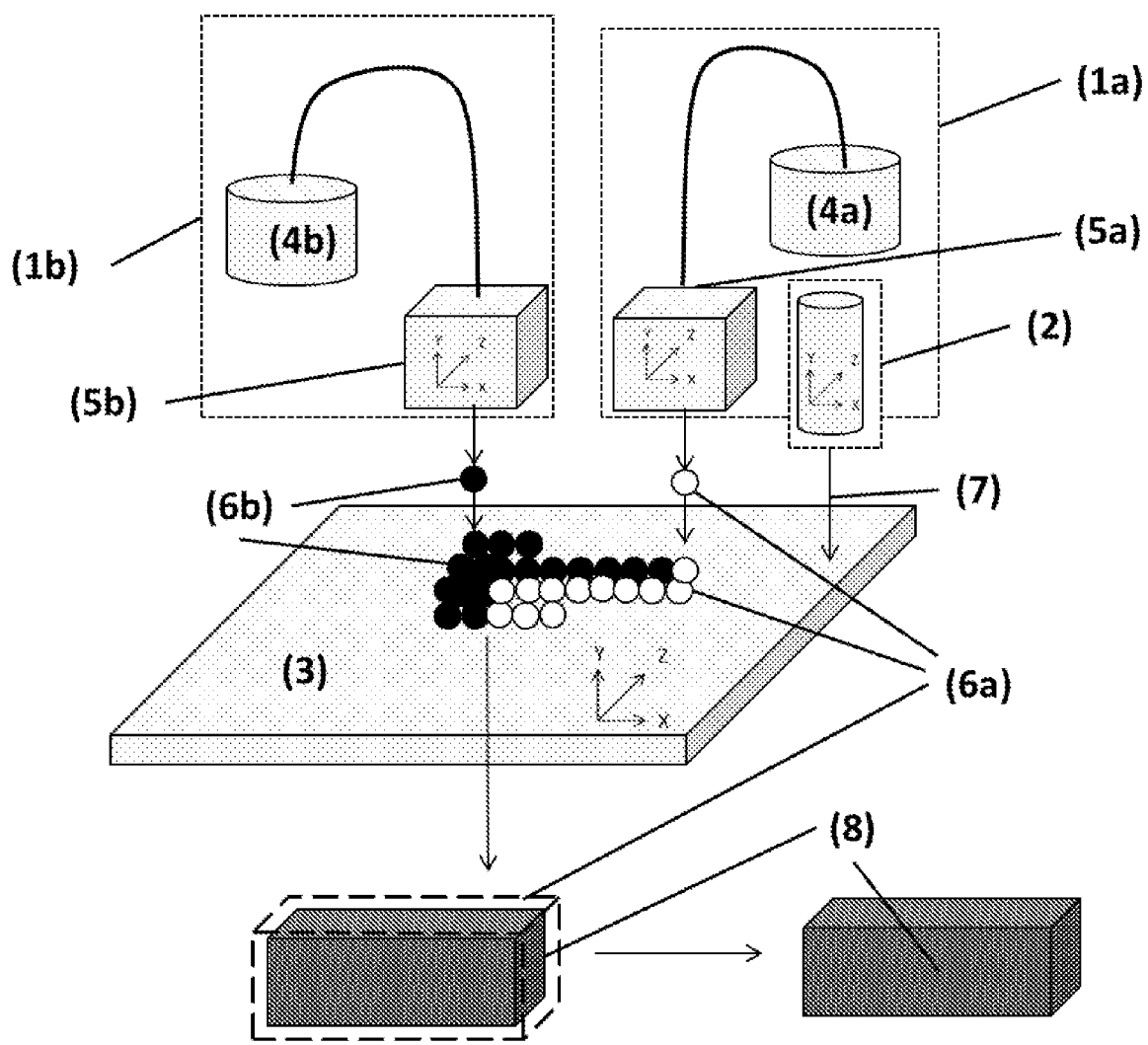
FIG. 1 schematically illustrates one embodiment of the manufacturing method of moldings of the invention.

The process of the invention is a process for the additive manufacturing of mouldings (8) via site-specific delivery of a structure-forming material (sfm)=(6b), characterized in that simultaneously or at staggered intervals at least one supportive material (sm)=(6a) is delivered into regions which remain free from sfm (6b), where the delivery of the sm (6a) is achieved by way of a device which has at least one delivery unit (1a) for the sm (6a), where the said unit can be positioned in x-, y- and z-direction with a precision of at least ±100 μm, and thus via the site-specific delivery of the sm (6a) not only in the x, y-operating plane but also in the z-direction successively constructs the supportive structure made of sm (6a) for the moulding (8), with the proviso that the sm (6a)

is a pseudoplastic, viscoelastic composition comprising
A) at least one polyether and
B) at least one particulate rheological additive,
C) optionally other additional substances
has a shear viscosity of at most 100 Pas (measured at 25° C. with shear rate 100 s$^{-1}$),
a structural relaxation parameter of at least 1 s, and
has a storage modulus G' of at least 5×10$^3$ Pa, and once the manufacturing of the moulding (8) has been concluded, the sm (6a) is removed from the moulding (8).

FIG. 1 is a diagram of an example showing the construction of a possible generative manufacturing system of the invention which is used to carry out the process of the invention for the production of silicone elastomer parts (8) with supportive structures (6a). The location of the pseudoplastic viscoelastic sm (6a) is in the reservoir (4a) of an individual metering system (1a) which is subject to pressure and has connection by way of a metering line to a metering nozzle (5a). Upstream or downstream of the reservoir (4a) there can be equipment permitting evacuation to remove dissolved gases. The sfm (6b) is delivered by way of another independently operating individual metering system (1b). (1b) Is likewise equipped with a reservoir (4b) which has connection by way of a metering line to a metering nozzle (5b). Upstream or downstream of the reservoir (4b) there can also be equipment permitting evacuation to remove dissolved gases.

The individual metering nozzles (5a) and (5b) can be accurately positioned independently of one another in the x-, y- and z-direction in order to permit precisely targeted deposition of the sm (6a) and, respectively, the sfm (6b) on the baseplate 3, which is preferably beatable and can likewise be positioned in the x-, y- and z-direction, and during the subsequent progress of formation of the moulding on the previously deposited sm (6a) or previously deposited, optionally previously crosslinked, sfm (6b).

For the crosslinking of the sfm (6b) there can moreover be one or more radiation sources (2) present which can preferably likewise be accurately positioned in the x-, y-, and z-direction and incipiently crosslink, or entirely crosslink, the sfm (6b) by means of radiation (7).

It is preferable that process units with high accuracy of repetition are used for the positioning of the metering nozzles (5a) and (5b). The precision of the process unit used for the positioning of metering nozzles (5a) and (5b) in all three spatial directions is at least ±100 μm, preferably at least ±25 μm. The maximal velocity of the process units used is a decisive factor in determining the production time of the moulding (8) and should therefore be at least 0.1 m/s, preferably at least 0.3 m/s, particularly preferably at least 0.4 m/s.

Preference is given to metering nozzles (5a) and (5b) which permit jetting of medium- to high-viscosity liquids. Those that can be used are in particular (thermal) bubble-jet heads and piezo printing heads, particular preference being given here to piezo printing heads. The latter permit jetting not only of low-viscosity materials, where droplet volumes of a few picolitres (where 2 pL corresponds to a dot diameter of about 0.035 μm) can be achieved, but also of medium- and high-viscosity materials such as the sm (6a), where preference is given to piezo printing heads with nozzle diameter from 50 to 500 μm, and droplet volumes in the nanolitre range (from 1 to 100 nL) can be produced. With low-viscosity compositions (<100 mPa·s) these printing heads can deposit droplets at very high metering frequency (about 1-30 kHz), while with higher-viscosity compositions (>100 mPa·s) metering frequencies up to about 500 Hz can be achieved, depending on rheology properties (shear-thinning behaviour).

The chronological sequence of the construction of supportive structures (6a) and targeted structures (6b) depends greatly on the desired geometry of the moulding (8): it can be more useful or indeed essential to begin by constructing at least parts of the supportive structures (6a), and then, to generate the actual targeted structure (6b). However, it can also be possible to generate both structures in parallel, i.e. without chronological separation, i.e. by means of parallel metering from two independent sets of metering equipment. An approach that is sometimes more useful comprises firstly the construction of at least parts of the targeted structure (6b), followed by construction of at least parts of supportive structures (6a). In the case of a component with complex geometry it is sometimes necessary to use all of the possible variants.

When liquid, uncrosslinked sfm (6b) is delivered, examples being acrylates and silicone rubber compositions, it is necessary to crosslink these to form stable targeted structures (8). It is preferable that the sfm (6b) deposited droplet by droplet is crosslinked by means of one or more sources (2) of electromagnetic radiation (e.g. IR laser, IR radiant source, UV/VIS laser, UV lamp, LED), which preferably likewise are displaceable in the x-, y- and z-directions. The radiation sources (2) can have deflection mirrors, focusing units, beam-expansion systems, scanners, diaphragms, etc. Deposition and crosslinking must be balanced with one another. The process of the invention comprises all relevant conceivable possibilities. By way of example, it can be necessary to begin by covering an area of the x-, y-operating plane with droplets of the sfm (6b) and to wait until levelling (coalescence) occurs before then irradiating and crosslinking this area. Equally it can be useful for shaping purposes to begin by solidifying the applied area only in the periphery region, and then to use suitable shading patterns for incipient crosslinking of the internal region. It can also be necessary to bring about crosslinking or incipient crosslinking, of individual droplets immediately after deposition thereof in order to prevent undesired flow. It can be advantageous to irradiate the entire operating region continuously during formation of the moulding, in order to achieve complete crosslinking, or to expose the same only briefly to the radiation in order to bring about controlled incomplete crosslinking (green strength); this can sometimes be accompanied by better adhesion of the individual layers to one another.

It will therefore generally be necessary that the parameters determining deposition and crosslinking axe balanced with one another in a manner depending on the crosslinking system, rheological behaviour, and the adhesive properties of the sfm (6b), and also optionally of the other materials used.

It is preferable that sfm (6b) used comprises liquid acrylates, acrylate-silicone copolymers or physical mixtures of these, acrylic-functional silicones or pure silicone rubber compositions. Preference is given to the use of acrylate-silicone copolymers or physical mixtures of these, acrylic-functional silicones or pure silicone rubber compositions, particularly acrylic-functional silicones or pure silicone rubber compositions, and in one specific embodiment silicone rubber compositions, in particular radiation-crosslinking silicone rubber compositions.

In order to avoid or eliminate contamination of the metering nozzles, the system shown in FIG. 1 can be supplemented by an automatic metering nozzle cleaning unit.

The individual metering systems can have a temperature control unit in order to condition the rheological behaviour of the materials and/or to utilize the viscosity reduction due to elevated temperatures for the jotting procedure.

The individual metering system (1a) can optionally also deliver the sm (6a) in the form of a thin bead, by the dispensing process. This process has advantages in particular for relatively large, flat structures, e.g. with respect to printing speed.

The process of the invention for the production of supportive structures (6a) can be combined with any of the known, processes for the additive manufacturing of structures where the structure-forming material (sfm)=(6b) is delivered site-specifically in liquid form. Among these are filament printing, dispensing, ink-jet processes and jetting. Preference is given to dispensing and jetting of medium- to high-viscosity, shear-thinning liquid sfm (6b); particular preference is given to the dispensing and jetting of addition-crosslinking silicone elastomers and, in one specific embodiment, the jetting of UV-activated or radiation-crosslinking silicone elastomers.

The entire apparatus, or "plant" shown by way of example in the diagram of FIG. 1 can also be accommodated in a vacuum chamber or inert-gas chamber, for example in order to exclude UV-C radiation losses due to oxygen or to avoid air inclusions in the moulding.

The printing chamber of the plant, or the entire plant, can be accommodated in a chamber in order to exclude atmospheric moisture; this chamber can be flushed with dry air from the outside, or the air in the chamber can be dried by pumped circulation through a drying unit, for example a drying cartridge using molecular sieve, or a condensing unit.

The pseudoplastic, viscoelastic sm (6a) used in the process of the invention is preferably composed of the following components:

A) polyether
B) particulate rheology additive
C) optionally other additional substances.

Component A

Polyethers, preferably polyalkylene glycols of the general formula (I)

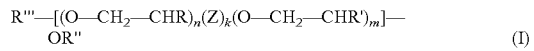

$$R'''—[(O—CH_2—CHR)_n(Z)_k(O—CH_2—CHR')_m]—OR'' \qquad (I)$$

are used, where

R is hydrogen or a C1-C4-hydrocarbon moiety, preferably hydrogen or a methyl moiety, and R' is defined in the same way as R, where the moieties R and R' can be identical or different, and R" is hydrogen, or an optionally substituted or mono- or polyunsaturated C1-C20-hydrocarbon moiety, aryl moiety, acyl moiety —(O)C—$R^x$ such as formyl, acetyl, benzoyl, acrylic, methacrylic, vinyl moiety, glycidoxy moiety, polyalkylene glycol moiety such as polyethylene glycol moiety or polypropylene glycol moiety having from 1 to 50 repeating units, and R''' is defined in the same way as R", where the moieties R" and R''' can be identical or different, and $R^x$ is hydrogen, or an optionally substituted or mono- or polyunsaturated C1-C20-hydrocarbon moiety or aryl moiety, and Z is a monomer having more than 2 hydroxy groups per molecule, i.e. a branching point, for example trihydric alcohols such as propanetriol or tetrahydric alcohols such as 2,2-bis(hydroxmethyl)-1,3-propanediol, where the hydroxy groups in the polyalkylene glycols are etherified with the alkylene glycol monomers and thus give branched polyalkylene glycols preferably having 3 or 4 side chains, and k is 0 or 1, and n, m are an integer from 0 to 1000, preferably from 0 to 500, with the proviso that the sum n+m is an integer from 1 to 1000, preferably from 5 to 500.

It is preferable that the polyalkylene glycols are linear or branched, having 3 or 4 side chains per molecule.

Preference is given to polyalkylene glycols with melting points below 100° C., preferably below 50° C., with particular preference being given to polyalkylene glycols which are liquid at room temperature (=25° C.).

Preference is given to polyethylene glycols with, number-average molar mass (Mn) from 200 g/mol to 10,000 g/mol.

Preference is also given to polypropylene glycols with Mn from 200 g/mol to 10,000 g/mol.

Particular preference is given to polyethylene glycols with Mn of about 200 g/mol (PEG 200), about 400 g/mol (PEG 400), about 600 g/mol (PEG 600), and about 1000 g/mol (PEG 1000). Particular preference is given to polypropylene glycols with Mn of about 425 g/mol, about 725 g/mol, about 1000 g/mol, about 2000 g/mol, about 2700 g/mol and about 3500 g/mol.

Preference is given to linear polyethylene glycol-polypropylene glycol copolymers with Mn from 200 g/mol to 1000,000 g/mol, particularly with Mn from 1000 g/mol to 50,000 g/mol, where these can be random or block copolymers.

Preference is given to branched polyethylene glycol-polypropylene glycol copolymers with Mn from 200 g/mol to 100,000 g/mol, particularly with Mn from 1000 g/mol to 50,000 g/mol, where these can be random or block copolymers.

Preference is given to polyalkylene glycol monoethers, i.e. polyethylene glycol monoethers, polypropylene glycol monoethers and ethylene glycol-propylene glycol copolymer monoethers with Mn from 1000 g/mol to 10,000 g/mol and having an a alkyl ether moiety, such as methyl ether, ethyl ether, propyl ether, butyl other or the like.

The polyalkylene glycols can preferably be used in pure form or in any desired mixtures.

Component B)

Particulate rheology additives used preferably comprise solid, fine inorganic particles.

It is preferable that the average particle size of the particulate rheology additives is <1000 nm, measured by means of photon-correlation spectroscopy on suitably dilute aqueous solutions, in particular with an average primary particle size of from 5 to 100 nm, determined by means of optical image evaluation on transmission electron micrographs. It is possible that these primary particles do not exist in isolation but instead are constituents of larger aggregates and agglomerates.

It is preferable that the particulate rheology additives are inorganic solvents, in particular metal oxides, particular preference being given to silicas. The specific surface area of the metal oxide is preferably from 0.1 to 1000 m$^2$/g (by the BET method in accordance with DIM 66131 and 66132), particularly from 10 to 500 m$^2$/g.

The metal oxide can have aggregates (definition in accordance with DIN 53206) in the range of diameters from 100 to 1000 nm, where the metal oxide has agglomerates (definition in accordance with DIM 53206) which are composed of aggregates and which can have sixes from 1 to 1000 μm, depending on the exterior shear loading (e.g. resulting from the conditions of measurement).

For reasons associated with industrial handling, it is preferable that the metal oxide is an oxide having a proportion of covalent bonding in the metal oxide bond, preferably an oxide in the solid physical state of the elements of main groups and transition groups, for example the 3$^{rd}$ main group, examples being boron oxide, aluminium oxide, gallium oxide or indium oxide, or of the 4$^{th}$ main group, examples being silicon dioxide, germanium dioxide, or tin oxide or tin dioxide, lead oxide or lead dioxide, or an oxide of the 4$^{th}$ transition group, examples being titanium dioxide, zirconium oxide, or hafnium oxide. Other examples are stable oxides nickel, cobalt, iron, manganese, chromium or vanadium.

Particular preference is given to aluminium(III) oxides, titanium(IV) oxides and silicon(IV) oxides, for example silicas or silica gels produced by solution-chemistry methods, for example precipitated silicas, or aluminium oxides, titanium dioxides or silicon dioxides produced in processes at elevated temperature, for example fumed aluminium oxides, titanium dioxides or silicon dioxides, or silica.

Other particulate rheology additives are silicates, aluminates or titanates, or aluminium phyllosilicates, for example bentonites, such as montmorillonites, or smectites or hectorites.

Particular preference is given to fumed silica, which is produced in a flame reaction preferably from silicon-halogen, compounds or organosilicon compounds, e.g. from silicon tetrachloride or methyldichlorosilane, or hydrogentrichlorosilane or hydrogenmethyidichlorosilane, or other methylchlorosilanes or alkylchlorosilanes, which may also be in a mixture with hydrocarbons, or any desired volatile or sprayable mixtures of organosilicon compounds, as mentioned, and hydrocarbons, e.g. in a hydrogen-oxygen flame, or else a carbon monoxide-oxygen flame. The silica here can optionally be produced with or without addition of water, for example in the purification step; it is preferable not to add water.

It is preferable that the surface fractal dimension of the metal oxides and in particular the silicas is smaller than or equal to 2.3, preferably smaller than or equal to 2.1, and in particular from 1.95 to 2.05, where the definition of the surface fractal dimension $D_S$ is as follows;

Particle surface h is proportional to the particle radius R raised to the power $D_S$.

The fractal dimension of the surface was determined by use of small-angle X-ray scattering (SAXS).

It is preferable that the mass fractal dimension $D_M$ of the metal oxides and in particular the silicas is smaller than or equal to 2.8, preferably smaller than or equal to 2.1, with particular preference from 2.4 to 2.6. The definition of the mass fractal dimension $D_M$ here is as follows:

Particle mass M is proportional to the particle radius R raised to the power $D_M$. The fractal dimension of the surface was determined by use of small-angle X-ray scattering (SAXS).

It is preferable that the particulate rheology additives B) are non-polar, i.e. surface-modified, in particular, hydrophobized, preferably silylated fine inorganic particles. Preference is given in this connection to hydrophobic silicas, particularly hydrophobic fumed silicas.

The expression hydrophobic silica in this connection means non-polar silicas which have been surface-modified, preferably silylated, for example those described in the laid-open specifications EP 686676 B1, EP 1433749 A1 and DE 102013226494 A1.

The meaning of this for the silicas used according to the invention is that the surface of the silica, has been hydrophobized, i.e. silylated.

It is preferable that the hydrophobic silicas used according to the invention have been modified, i.e. silylated, with organosilicon compounds, e.g.

(i) organosilanes or organosilasanes of the formula (II)

$$R^1{}_dSiY_{4-d} \qquad (II)$$

and/or partial hydrolysates of these,
where
R$^1$ can be identical or different and is a monovalent, optionally substituted optionally mono- or polyunsaturated, optionally aromatic hydrocarbon moiety having from 1 to 24 carbon atoms which can have interruption by oxygen atoms, d is 1, 2 or 3 and
Y can be identical or different and is halogen atom, monovalent Si—N-bonded nitrogen moieties on which there can be a further silyl moiety bonded, —OR$^2$ or —OC(O) OR$^2$, where R$^2$ is hydrogen atom or a monovalent, optionally substituted, optionally mono- or polyunsaturated hydrocarbon moiety which can be interrupted by oxygen atoms, or (ii) linear, branched or cyclic organosiloxanes made of units of the formula (III)

$$R^3{}_e(OR^4)_fSiO_{(4-e-f)/2} \qquad (III),$$

where
R$^3$ can foe identical or different and complies with one of the definitions provided above for R$^1$,
R$^4$ can be identical or different and complies with a definition provided for R$^3$,
e is 0, 1, 2 or 3,
f is 0, 1, 2, 3, with the proviso that the sum e+f is ≤3, and the number of these units per moiety is at least 2; or
mixtures of (i) and (ii) are used.

The organosilicon compounds which can be used for the silylation of the silicas can by way of example be mixtures of silanes or silazanes of the formula (II), preference being given here to those made of methylchlorosilanes on the one hand, or alkoxysilanes and optionally disilazanes on the other.

Examples of in formula (II) are preferably the methyl, octyl, phenyl and vinyl moiety, particular preference being given to the methyl moiety and the phenyl moiety.

Examples of $R^2$ are the methyl, ethyl, propyl and octyl moiety, preference being given here to the methyl and ethyl moiety.

Preferred examples of the organosilanes of the formula (II) are alkylchlorosilanes such as methyltrichlorosilane, dimethyldichlorosilane, trimethylchlorosilane, octylmethyidichlorosilane, octyltrichlorosilane, octadecylmethyldichlorosilane and octadecyltrichlorosilane, methylmethoxysilanes such as methyltrimethoxysilane, dimethyldimethoxysilane and trimethylmethoxysilane, methylethoxysilanes such as methyltriethoxysilane, dimethyldiethoxysilane and trimethylethoxysilane, methylacetoxysilanes such as methyltriacethoxysilane, dimethyldiacethoxysilane and trimethylacethoxysilane, phenylsilanes such as phenyltrichlorosilane, phenylmethyldichlorosilane, phenyldimethylchlorosilane, phenyltrimethoxysilane, phenylmethyldimethoxysilane, phenyldimethylmethoxysilane, phenyltriethoxysilane, phenylmethyldiethoxysilane and phenyidimethyiethoxysilane, vinylsilanes such as vinyltrichlorosilane, vinylmethyldichlorosilane, vinyldimethylchlorosilane, vinyltrimethoxysilane, vinylmethyldimethoxysilane, vinyidimethylmethoxysiiane, vinyitriethoxysilane, vinylmethyldiethoxysilane and vinydimethylethoxysilane, disilazanes such as hexamethyldisilazane, divinyltetramethyldisilazane and bis(3,3-trifluoropropyl)tetramethyldisilazane, cyclosilasanes such as octamethylcyclotetrasilazane, and silanols such as trimethylsilanol.

Particular preference is given to methyltrichlorosilane, dimethyldichlorosilane and trimethylchlorosilane or hexamethyldisilazane.

Preferred examples of organosiloxanes of the formula (III) are linear or cyclic dialkylsiloxanes having an average number of diaikylsiloxy units greater than 3. The dialkylsiloxanes are preferably dimethylsiloxanes. Particular preference is given to linear polydimethylsiloxanes having the following terminal groups: trimethylsiloxy, dimethylhydroxysiloxy, dimethylchlorosiloxy, methyldichlorosiloxy, dimethylmethoxysiloxy, methyldimethoxysiloxy, dimethylethoxysiloxy, methyldiethoxysiloxy, dimethylacethoxysiloxy, methyldiacethoxysiloxy and dimethylhydroxysiloxy groups, in particular having terminal trimethylsiloxy or dimethylhydroxysiloxy groups.

The viscosity of the polydimethylsilokanes is preferably from 2 to 100 mPa·s at 25° C.

The silanol group density of the hydrophobic silicas used according to the invention is preferably smaller than 1.8 silanol groups per $nm^2$, preferably at most 1.0 silanol groups per $nm^2$ and most preferably at most 0.9 silanol groups per $nm^2$.

The carbon content of the hydrophobic silicas used according to the invention is preferably greater than, or equal, to 0.4% by weight of carbon, with preference from 0.5% by weight to 15% by weight of carbon and with particular preference from 0.75% to 10% by weight of carbon, where the weight is based on the hydrophobic silica.

The methanol number of the hydrophobic silicas used according to the invention is preferably at least 30, with preference at least 40 and with particular preference at least 50.

The DBP number (dibutyl phthalate number) of the hydrophobic silicas used according to the invention is preferably smaller than 250 g/100 g, with preference from 150 g/100 g to 250 g/100 g.

The tamped density of the hydrophobic silicas used according to the invention, measured in accordance with DIN EN ISO 787-11, is preferably from 20 g/l to 500 g/l, with preference from 30-200 g/l.

The silanol group density is determined by means of acid-base titration, as disclosed by way of example in G. W. Sears, Anal. Chem. 1956, 28, 1981.

The carbon content can be determined by elemental analysis. The methanol number is the percentage proportion of methanol that has to be added, to the aqueous phase in order to achieve complete wetting of the silica. The expression complete wetting here means that ail of the silica sinks in the water-methanol test liquid.

The analytical methods used to characterize component B) are moreover stated in more detail below in the Examples section.

Particulate rheology additive B) used can comprise any desired mixtures of fine inorganic particles, and in particular it is possible to use mixtures of various silicas, e.g. mixtures of silicas of different BET surface area, or mixtures of silicas with different silylation or mixtures of unmodified and silylated silicas.

In the case of mixtures of silylated, e.g. hydrophobic, non-polar silicas and unmodified, i.e. hydrophilic, polar silicas it is preferable that the proportion of the hydrophobic silicas, based on the total, quantity of silica, is at least 50 percent of weight (% by weight), preferably at least 80% by weight and most preferably at least 90% by weight.

The specific surface area of the unmodified i.e. hydrophilic, polar silicas is preferably from 0.1 to 1000 $m^2/g$, more preferably from 10 to 500 $m^2/g$ (measured by the BET method in accordance with DIN 66131 and 66132).

The silanol group density of the unmodified, i.e. hydrophilic, polar silicas is preferably from 1.8 silanol groups per $nm^2$ to 2.5 silanol groups per $nm^2$, with preference from 1.8 silanol groups per $nm^2$ to 2.0 silanol groups per $nm^2$.

The methanol number of the unmodified, i.e. hydrophilic, polar silicas is smaller than 30, preferably smaller than 20, more preferably smaller than 10, and in one specific embodiment the unmodified, i.e. hydrophilic, polar silicas are completely wetted by water without addition of methanol.

The tamped density of the unmodified, i.e. hydrophilic, polar silicas, measured in accordance with DIN EN ISO 787-11, is from 20 g/l to 500 g/l, preferably from 30 to 200 g/l and more preferably from 30 to 150 g/l.

The DBF number (dibutyl phthalate number) of the unmodified, i.e. hydrophilic, polar silicas used according to the invention is preferably less than 300 g/100 g, with preference from ISO g/100 g to 280 g/100 g.

Other Additional Substances C

The sm (6a) of the invention can comprise other additional functional substances, for example
  colours, such as organic or inorganic colour pigments or molecularly soluble dyes;
  solvents conventionally used in industry, for example water, acetone, alcohols, aromatic or aliphatic hydrocarbons;

stabilizers, such as heat stabilizers or UV stabilizers;

UV tracers, such as fluorescence dyes, e.g. rhodamines, fluoresceins or other tracers for the detection of residual traces of sm on components polymers, such as polymeric rheology additives or levelling aids;

fillers, such as nonreinforcing fillers, for example fillers with BET surface area up to 50 m$^2$/g, for example quartz, diatomaceous earth, calcium silicate, zirconium silicate, zeolites, aluminium oxide, titanium oxide, iron oxide, zinc oxide, barium sulphate, calcium carbonate, gypsum, silicon nitride, silicon carbide, phyllosilicates, such as mica, montmorillionites, boron nitride, glass, and plastics powder water scavengers or desiccants, for example molecular sieves or hydratable salts such as anhydrous $Na_2SO_4$, with average particle size smaller than 500 μm preferably smaller than 100 μm.

The Supportive Material (6a) of the Invention

The am (6a) of the invention is composed of from 50% by weight to 99% by weight of A), from 1% by weight to 50% by weight of B) and from 0% by weight to 25% by weight of C); it is preferable that the sm (6a) of the invention is composed of from 70% by weight to 95% by weight of A) from 5% by weight to 30% by weight of B) and from 0% by weight to 10% by weight of C).

The sm (6a) of the invention is in particular characterized in that it has pseudoplastic and viscoelastic properties.

In particular, the sm (6a) used according to the invention has pseudoplastic properties i.e. the viscosity $\gamma\eta(\ )$ of the sm (6a) depends on the shear raye and falls as shear rate increases; this effect is reversible, and the viscosity in turn increases when shear rate decreases.

In particular, the sm (6a) used according to the invention has high viscosity at low shear rate. It is preferable that the value of the viscosity, measured at shear rate 1 s$^{-1}$ at 25° C. is greater than 100 Pas, preferably from 100 Pas to 10,000 Pas, and most preferably from 100 Pas to 1000 Pas.

In particular, the sm (6a) used according to the invention has low viscosity at high shear rate. It is preferable that the value of the viscosity, measured at shear rate 100 s$^{-1}$ at 25° C. is less than 100 Pas, preferably from 0.1 Pas to 50 Pas, and most preferably from 1 Pas to 50 Pas.

The method for viscosity (=shear viscosity) determination is described in detail at a later stage below in the context of the Examples.

In particular, the sm (6a) used according to the invention has thixotropic behaviour, i.e. by way of example the increase of shear viscosity after reduction of shear rate is time-dependent. This behaviour can be described by means of a structural relaxation parameter $R^{90}$ (1000;0.01). This corresponds to the time elapsed, after termination of a high-shear phase with shear rate 1000 s$^{-1}$, before the shear viscosity reaches 90% of the maximal viscosity value of the subsequent low-shear phase with shear rate 0.01 s$^{-1}$. The value of $R^{90}$ (1000;0.01) is preferably from 0.1 s to 100 s, with preference from 0.5 s to 75 s, and with particular preference from 1 s to 50 s.

It is preferable that the shape of the curve for this viscosity increase is concave, i.e. curves towards the abscissa.

It is preferable that the concave viscosity increase curve exhibits a continuous decrease of the gradient dη/dt. This means that the average gradient in the first third of the curve $\overline{(d\eta/dt)_1}$ is greater than the average gradient of the curve in the second third of the curve $\overline{(d\eta/dt)_2}$, and that the average gradient in the second third of the curve $\overline{(d\eta/dt)_2}$ is greater than the average gradient of the carve in the third third of the curve $\overline{(d\eta/dt)_3}$, where the total time period of the curve is defined by the magnitude of the structural relaxation parameter $R^{90}$ (1000; 0.1).

It is preferable that the quotient $\overline{(d\eta/dt)_1}/\overline{(d\eta/dt)_3}$ is greater than 1, particularly greater than 1.5, and in one specific embodiment greater than 2.

The sm (6a) used according to the invention is moreover characterized in that it exhibits viscoelastic behaviour, and in particular exhibits viscoelastic solid properties in the linear-viscoelastic (LVE) range. This means that, within the LVE range, defined according to T. Mezger, G., The Rheology Handbook, 2nd Edn., Vincentz Network GmbH & Co. KG; Germany, 2006, 147ff., the value of the loss factor tan δ=G"/G' is less than 1, preferably less than 0.5 and most preferably less than 0.25.

The sm (6a) used according to the invention is moreover characterized in that it is a stable physical gel. This means that the plateau value of the storage modulus G' within the LVE range at 25° C. is greater than $5 \times 10^3$ Pa and preferably greater than $1 \times 10^4$ Pa and moat preferably greater than $2 \times 10^4$ Pa.

The gel is moreover characterized in that the value of the critical flow stress $\tau_{crit}$, i.e. the stress τ at which G'=G" is greater than 1 Pa, preferably greater than 5 Pa and most preferably greater than 25 Pa.

It is preferable that the sm (6a) used according to the invention exhibits uniform thermal-rheology behaviour in the temperature range from 20° C. to 200° C., with preference in the temperature range from 25° C. to 150° C. and with particular preference in the temperature range from 25° C. to 100° C., with the proviso that the lower value of the temperature range is at least 5° C. above the softening range of the polyether used. This means that the sm (6a) used according to the invention exhibits no changes in the character of its structure within this temperature range, e.g. no transition from a viscoelastic solid to a viscoelastic liquid.

In particular, the temperature dependency of the shear viscosity can be described by means of an Arrhenius plot where the natural logarithm of the shear viscosity (ln η) is plotted on the y-axis and the reciprocal absolute temperature (1/T [K$^{-1}$]) is plotted on the x-axis. The activation energy of the flow process can be determined from the gradient by means of linear regression. The activation energy of the flow process for the sm (6a) used according to the invention, for shear rate 10 s$^{-1}$, is preferably in the range from 1 to 100 kJ/mol, with preference in the range from 5 to 50 kJ/mol and most preferably in the range from 10 to 30 kJ/mol.

It is preferable that within the technically relevant temperature range the sm (6a) used according to the invention exhibits no change of its structural character, e.g. no transition from a viscoelastic solid to a viscoelastic liquid. This means in particular that the value of the loss factor tan δ is smaller than 1 in the temperature range from 20° C. to 200° C., preferably in the temperature range from 20° C. to 150° C. and most preferably in the temperature range from 20° C. to 100° C.

This also means that the plateau value of the storage modulus G' within the LYE range in the temperature range from 20° C. to 200° C., preferably the temperature range of 20° C. to 150° C. and most preferably in the temperature range from 20° C. to 100° C. is greater than $5 \times 10^2$ Pa, preferably greater than $1 \times 10^3$ Pa and most preferably greater than $5 \times 10^3$ Pa. This moreover means that the value of the critical flow stress $\tau_{crit}$, i.e. the stress τ at which G'=G", in the temperature range from 20° C. to 200° C., preferably in the temperature range from 20° C. to 150° C. and particularly preferably in the temperature range from 20° C. to 100° C. is greater than 1 Pa, preferably greater than 5 Pa, and most preferably greater than 10 Pa.

The sm (6a) used according to the Invention Is moreover characterized in that silicones can spread on the surface of the sm (6a). This means that the contact angle of a low-molecular-weight silicone oil (e.g. AK 100 from Wacker Chemie AG) is less than 90°, preferably less than 60°, and that most preferably, spontaneous wetting of the sm occurs without formation of any measurable contact angle.

The sm (6a) used according to the invention is moreover characterized in that it does not change when briefly irradiated with electromagnetic radiation, e.g. with UV light in the context of the radiation-crosslinking of the sfm (6b), i.e. exhibits no degradation reactions, polymerization reactions or loss of gel stability.

The sm (6a) used according to the invention is in particular characterized in that, after hardening of the sfm (6b), it can easily be removed from the moulding (8) mechanically or via dissolution in a solvent. This can be achieved mechanically, e.g. by means of compressed air, spinning, e.g. by means of a centrifuge, brushes, scrapers or the like. Removal can moreover be achieved via solution in a suitable solvent. Preference is given here to solvents that do not endanger the environment or the end user, preferably water. The solvent can optionally be heated for this purpose and/or in particular suitable surfactants can be added to the water, examples being anionic, cationic or neutral surfactants. Washing can optionally be achieved in a machine, for example in a suitable dishwashing machine.

It is preferable that the sm (6a) used according to the invention is recycled after removal from the moulding (8). To this end, it has proved advantageous for the sm (6a) used according to the invention to have low absorption capacity for volatile constituents of the sfm (6b), for example low-molecular-weight siloxanes in the case of silicone elastomers as sfm (6b).

When the sm dispersions comprising particulate rheology additives B) are produced, the particulate rheology additives B) are mixed into the polyether A).

For the production of the sm dispersions, the particulate rheology additives B) can be added to the liquid A) and distributed by wetting, or by shaking, for example by use of a tumbler mixer or a high-speed mixer, or by stirring. In the case of low particle concentrations below 10% by weight, simple stirring is generally sufficient for the incorporation of the particles B) into liquid A). Preference is given to a very high shear gradient for the incorporation and dispersion of particles B) into the liquid A). Preference is given to the following for this purpose: high-speed stirrers, high-speed dissolvers, e.g. with peripheral velocities of from 1 to 50 m/s, high-speed rotor-stator systems, Sonolatores, nips, nozzles, ball mills, etc.

Batchwise and continuous methods can be used for mixing, preference being given to continuous methods.

Suitable systems are in particular those that initially use effective stirrer units to achieve the wetting and incorporation of the particulate rheology additives B) into the liquid A), for example in a closed vessel or tank, and in a second step, use a very high shear gradient to disperse the particulate rheology additives B). This can be achieved via a dispersion system in the first vessel, or by pumped circulation from the vessel into external piping which comprises a dispersion unit, preferably with closed-circuit return to the vessel. This procedure can preferably be designed to be continuous by using partial return and partial continuous removal.

In particular, the use of ultrasound in the range from 5 Hz to 500 kHz, preferably from 10 kHz to 100 kHz, and most preferably from 15 kHz to 50 kHz, is a suitable method of dispersing the particulate rheology additives B) in the sm dispersion; the ultrasonic dispersion, procedure can take place continuously or batchwise. This can be achieved via individual ultrasonic transmitters, such as ultrasonic tips, or in through-flow systems which comprise one or more ultrasonic transmitters, optionally being systems separated via piping or via a pipe wall.

Ultrasonic dispersion can take place continuously or batchwise.

Dispersion can be achieved in conventional mixing equipment suitable for the production of emulsions or dispersions and providing a sufficiently large supply of shear energy, for example high-speed stator-rotor stirrer equipment, for example as designed by Prof. P. Willems, known by the registered trademark "Ultra-Turrax", or in other stator-rotor systems known by registered trademarks such as Kady, Unimix, Koruma, Cavitron, Sonotron, Netzsch or Ystral. Other processes are ultrasonic processes using, for example, US probes/transmitters and US through-flow cells, and US systems such as, or similar to, those supplied by Sonorex/Bandelin, and ball mills, for example the Dyno-Mill from WAB, CH. Other processes use high-speed stirrers, such as blade stirrers or paddle stirrers, dissolvers such as disc dissolvers, for example from Getzmann, and mixing systems such as planetary dissolvers, paddle dissolvers and other combined assemblies derived from dissolver systems and stirrer systems. Other suitable systems are extruders and kneaders.

It is preferable that the incorporation and dispersion of the particulate rheology additives B) take place in vacuo or include an evacuation step.

It is preferable that the incorporation and dispersion of the particulate rheology additives B) take place at elevated temperature in the temperature range from 25° C. to 200° C., with preference from 25° C. to 150° C. and with particular preference from 25° C. to 100° C. The temperature rise can preferably be controlled via external heating/cooling.

It is, of course, also possible to produce the sm dispersion by another method. However, it has been found that the type of process is critical, and that some types of production processes do not give sm (6a) that can be used according to the invention.

It is preferable that the sm (6a) used according to the invention is charged to suitable metering containers (4a), examples being cartridges, tubular bags, and the like. It is preferable that the metering containers (4a) are then welded into another material, e.g. into metallized foil, to prevent ingress of atmospheric moisture.

It is preferable that the sm (6a) used according to the invention is degassed before and/or during charging to the container, for example by applying a suitable vacuum or by means of ultrasound.

It is preferable that the sm (6a) used according to the invention is dried before charging to the container, for example by applying a suitable vacuum at elevated temperature.

The content of free water in the sm (6a) used, i.e. water not bound to water scavenger or desiccant, is less than 10% by weight, preferably less than 5% by weight, and most preferably less than 1% by weight. The content of free water can, by way of example, be determined quantitatively by means of Karl Fischer titration or NMR spectroscopy.

It is preferable that the sm (6a) used according to the invention is delivered from the metering containers via mechanical pressure and/or by means of air pressure or vacuum.

EXAMPLES

The following examples serve for illustration of the present invention, without restriction of the same.

All percentage data are based on weight. Unless otherwise stated, all operations are carried out at room temperature, 25° C., and at atmospheric pressure (1.013 bar). The apparatuses are commercially available laboratory equipment of the types supplied commercially by numerous equipment producers.

Analytical Methods for the Characterization of the Silicas (Component B)

Methanol Number

Test of wettability with water-methanol mixtures (% by volume of MeOH in water): equal volumes of silica and water-methanol mixture are shaken together starting with 0% of methanol in the event of non-wetting at least some of the silica floats; a mixture with the proportion of MeOH increased by 5% by volume is to be used in the event of wetting the entire volume of the silica sinks; the proportion of MeOH (% by volume) in water gives the methanol number.

Carbon Content (% of C)

Elementary analysis for carbon was carried out in accordance with DIN ISO 10694 by using a CS-530 elemental analyser from Eltra GmbH (D-41469 Neuss).

Residual Silanol Content

Residual silanol content was determined in accordance with G. W. Sears et al. Analytical Chemistry 1956, 28, 1981ff by means of acid-base titration of the silica suspended in a 1:1 mixture of water and methanol. The titration was carried out in the region above the isoelectric point and below the pH range of dissolution of the silica. Residual silanoi content in % can accordingly be calculated from the following formula:

SiOH=SiOH(silyl)/SiOH(phil) 100% where

SiOH(phil): titration volume from titration of the untreated silica

SiOH(silyl): titration volume from titration of the silylated silica

DBP Number

Dibutyl phthalate absorption is measured with RHEOCORD 90 from Haake, Karlsruhe. For this, 12 g±0.001 g of the silicon dioxide powder are charged to a kneading chamber, which is sealed by a cover, and dibutyl phthalate is metered into the chamber by way of a hole in the cover at a prescribed metering rate of 0.0667 ml/s. The kneader is operated with a motor rotation rate of 125 revolutions per minute. Once the torque maximum has been reached, the kneader and the DBP metering are automatically switched off. The quantity of DBP consumed and the input quantity of the particles are used to calculate the DBF absorption as follows: DBF number (g/100 g)=(quantity consumed of DBP in g/input weight of powder in g)×100.

BET Surface Area

BET surface area is determined (with nitrogen) in accordance with DIN 66131.

Rheological Measurements

Unless otherwise stated, all measurements were made in an MCR 302 air-bearing rheometer from Anton Paar at 25° C. Measurements were made with plate-on-plate geometry (25 mm) with gap width 300 µm. Excess sample material was removed ("trimmed") by a wooden spatula once the plates had been closed to give the gap for the test. Before the actual profile was measured, the sample was subjected to a defined pre-shear in order to eliminate the rheological history derived from sample application and closing of the plates to the position for the test. The pre-shear comprised a shear phase of 60 s at shear rate 100 s$^{-1}$ followed by a minimal-shear phase of 300 s.

The shear viscosities were determined from what is known as a stepped profile, where the sample was sheared at a constant shear rate of 1 s$^{-1}$, 10 and 100 s$^{-1}$ in each case for 120 s. Measurement point duration was 12 s (1 s$^{-1}$) and 10 s (10 s$^{-1}$, 100 s$^{-1}$), and the average of the final 4 data points of a block was taken to give the shear viscosity.

The structural relaxation parameter R$^{90}$ (1000;0.01) and the quotient $\overline{(d\eta/dt)_1}/\overline{(d\eta/dt)_3}$ were determined from a test involving sudden change of shear rate. For this the sample is first sheared for 60 s at shear rate 0.01 s$^{-1}$ (measurement point duration 10 s), then for 0.5 a at shear rate 1000 s$^{-1}$ (measurement point duration 0.05 s) and then for 240 s at 0.01 s$^{-1}$ (measurement point duration 1 s).

The loss factor tan δ, the critical shear stress With and the plateau value of the storage modulus C4 were obtained from a dynamic deformation test in which the sample was subjected to load at a constant angular frequency of 10 rad/s with increasing deformation amplitude with controlled deformation in the deformation range from 0.01 to 100. Measurement point duration was 30 s with 4 measurement points per decade. The plateau value of the storage modulus G' here is the average of data points 2 to 7, with the proviso that these are within the linear-viscoelastic range, i.e. exhibit no dependency on deformation or shear stress.

The value selected for the loss factor tan δ was the value at the 4$^{th}$ measurement point.

3D Printer: The examples described below of the process of the invention used, as generative manufacturing system, a NEO 3D printer from German RepRap GmbH, which was modified and appropriately adapted for the tests. The thermoplastic filament metering unit originally installed in the NEO 3D printer was replaced by a jetting nozzle from Vermes Microdispensing GmbH, Otterfing, in order to permit deposition in droplet form of compositions ranging from those having relatively high viscosity to those that are self-supporting pastes, an example being the sm used according to the invention.

Because the NEO printer was not equipped as standard for the installation of jetting nozzles, it was modified. The Vermes jetting nozzle was incorporated into the printer control system in such a way that the start-stop signal (trigger signal) of the Vermes jetting nozzle was actuated by the G-code control system of the printer. To this end, a specific signal was stored in the G-code control system. The G-code control system of the computer therefore merely switched the jetting nozzle on and off (start and stop of metering).

For the transmission of the start-stop signal, the heating cable of the originally installed filament heating nozzle of the NEO printer was separated and (by way of a relay, optionally omitted) connected to the Vermes nozzle.

The other metering parameters (metering frequency, rising, falling, etc.) of the Vermes jetting nozzle were adjusted by means of the MDC 3200+ Microdispensing Control Unit.

The 3D printer was controlled by means of a computer. The software control system and control signal interface of the 3D printer (Repitier-Host software) were modified so as to permit control not only of the movement of the metering nozzle in the three spatial directions but also of the droplet deposition signal. The maximal displacement velocity of the NEO 3D printer is 0.3 m/s.

Metering System: The metering system for the sm compositions used, or the radiation-crosslinking silicon-elastomer structural material, was the MDV 3200 A microdispensing metering system from Vermes Microdispensing GmbH, consisting of a complete system with the following components: a) MDV 3200 A nozzle unit with connection system for Luer-taper cartridges, to the upper side of which compressed air at from 3 to 8 bar was applied (flexible tube with adapter), b) Vermes MDH-230tfl ancillary nozzle heating system on left-hand side, c) MDC 3200+ MicroDispensing Control Unit, which in turn had connection to the PC control system and also, by way of moving cables, to the nozzle, permitted adjustment of the metering parameters for jetting (Rising, Falling, Opentime, Needlelift, Delay, No Pulse, Heater, Nozzle, Distance, Voxel Diameter, Admission Air Pressure at Cartridge). Nozzles with diameters 50, 100, 150 and 200 µm are available. It is thus possible to achieve accurate placing of very fine droplets of sm (6a) in the nanolitre range on any desired xyz position on the baseplate or on the crosslinked sfm (6b). Unless otherwise stated in the individual Examples, a 200 µm nozzle (nozzle insert N11-200) was installed as a standard nozzle insert in the Vermes valve.

Storage containers (4a) used for the sm composition (6b) were vertically positioned 30 ml Luer-taper cartridges, connected to the dispensing nozzle by screw thread preventing liquid leakage; compressed air was applied to the cartridge.

The modified NEO 3D printer and the Vermes metering system were controlled by a PC and Simplify 3D open-source software.

Radiation Source:

UV Chamber with Osram UV Lamp

For off-line UV irradiation for the crosslinking of the sfm (6b) of components, a UV irradiation chamber was used which had a reflective internal finish and the following external dimensions:

| | |
|---|---|
| Length | 50 cm |
| Height | 19 cm |
| Width | 33 cm |

The distance between the fluorescent UV lamp and the substrate was 15 cm.

Radiation source: Osram Puritec HNS L 36 W 2G11 with wavelength 254 nm, UV lamp with electrical power rating 36 watts, Osram GmbH, Steinerne Furt 62, 8616 Augsburg.

Conditioning of the sm Compositions (6a) and sfm (6b) Compositions:

All of the materials used were devolatilized before use in a 3D printer by storing 100 g of the composition in an open PE jar for 3 h in a desiccator in vacuo at 10 mbar and room temperature (=25° C.). Under conditions excluding air, the composition was then charged to a 30 ml cartridge with bayonet seal, and sealed by an appropriately sized ejector piston (made of plastic). The luer-taper cartridge was then screwed into the vertical cartridge holder of the Vermes metering valve in a manner that prevented escape of liquid with the Luer-taper screw thread downwards and compressed air at from 3 to 8 bar was applied to the piston upper side of the cartridge; the ejector piston located in the cartridge prevents passage of the compressed air into the previously evacuated composition.

Example 1 (E1)

360 g of polyethylene glycol with average molar mass Mn 600 g/mol (PEG 600) were used as initial charge in a laboratory mixer from PC Laborsystem GmbH with paddle dissolver (dissolver disc diameter 60 mm), and 36 g of HDK® H18 hydrophobic fumed silica (obtainable from Wacker Chemie AG; for analytical data see Table 1) were added in portions, with stirring, over a period of about 1 h at a temperature of 45° C. The fixture was then dispersed at 45° C. for 0.5 h at 800 rpm, and then stirred for a further 30 min in vacuo at 45° C. and 800 rpm. This gave a clear gel, analytical data for which are collated in Table 2.

Example 2 (E2)

360 g of polyethylene glycol with average molar mass Mn 600 g/mol (PEG 600) were used as initial charge in a laboratory mixer from PC Laborsystem GmbH with paddle dissolver (dissolver disc diameter 60 mm), and 10 g of HDK® N20 hydrophilic fumed, silica (obtainable from Wacker Chemie AG; for analytical data see Table 1) and then 36.0 g of HDK® H18 hydrophobic fumed silica (obtainable from Wacker Chemie AG; for analytical data see Table 1) were added in portions, with stirring, over a period of about 1 h at a temperature of 45° C. The mixture was then dispersed at 45° C. for 30 min at 800 rpm, and then stirred for a further 30 min in vacuo at 45° C. at 800 rpm. This gave a clear gel, analytical data for which are collated in Table 2.

Example 3 (E3)

360 g of polyethylene glycol with average molar mass Mn 600 g/mol. (PEG 600) were used as initial charge in a laboratory mixer from PC Laborsystem GmbH with paddle dissolver (dissolver disc diameter 60 mm), and 70.0 g of HDK® H30RM hydrophobic fumed silica (obtainable from Wacker Chemie AG; for analytical data see Table 1) were added in portions, with stirring, over a period of about 1 h at a temperature of 45° C. The mixture was then dispersed at 45° C. for 0.5 h at 800 rpm, and then stirred for a further 30 min in vacuo at 45° C. and 800 rpm. This gave a clear gel, analytical data for which are collated in Table 2.

Example 4 (E4)

360.0 g of polyethylene glycol-polypropylene glycol copolymer with average molar mass Mn about 15 000 g/mol and viscosity about 3000 mPas at 50° C. (obtainable as polyglycol P41/3000 from Clariant) were used as initial charge in a laboratory mixer from PC Laborsystem GmbH with paddle dissolves (dissolves disc diameter 60 mm), and 36.0 g of HDK® U H18 hydrophobic fumed silica (obtainable from Wacker Chemie AG; for analytical data see Table 1) were added in portions, with stirring, over a period of about 1 h at a temperature of 45° C. The mixture was then dispersed at 45° C. for 0.5 h at 800 rpm, and then stirred for a further 30 min in vacuo at 45° C. and 800 rpm. This gave a clear gel, analytical data for which are collated in Table 2.

Example 5 (E5)

360.0 g of a mixture of 356.0 g of polyethylene glycol with average molar mass Mn 600 g/mol (PEG 600) and 4.0 g of a polyethylene glycol with average molar mass Mn 8000 g/mol (PEG 8000) were used as initial charge in a laboratory mixer from PC Laborsystem GmbH with paddle dissolver (dissolves disc diameter 60 mm), and 36.0 g of HDK® H18 hydrophobic fumed silica (obtainable from Wacker Chemie AG; for analytical data see Table 1) were added in portions, with stirring, over a period of about 1 h at a temperature of 45° C., The mixture was then dispersed at 45° C. for 0.5 h at 800 rpm, and then stirred for a further 30 min in vacuo at 45° C. and 800 rpm. This gave a clear gel, analytical data for which are collated in Table 2.

Example 6 (E6)

360 g of polypropylene glycol with average molar mass Mn 2000 g/mol (PPG 2000) were used as initial charge in a laboratory mixer from PC Laborsystem GmbH with paddle dissolver (dissolver disc diameter 60 mm., and 90.0 g of HDK® H18 hydrophobic famed silica (obtainable from Slacker Chemie AG; for analytical data see Table 1) were added in portions, with stirring, over a period of about 1 h at a temperature of 45° C. The mixture was then dispersed at 45° C. for 0.5 h at 800 rpm, and then stirred for a further 30 min in vacuo at 45° C. and 800 rpm. This gave a clear gel, analytical data for which are collated in Table 2.

Example 7 (E7)

360 g of polyethylene glycol with average molar mass Mn 600 g/mol (PEG 600) were used as initial charge in a laboratory mixer from PC Laborsystem GmbH with paddle dissolver (dissolver disc diameter 60 mm), and firstly 9.0 g of anhydrous $Na_2SO_4$ and then 36 g of HDK® H18 hydrophobic fumed silica (obtainable from backer Chemie AG; for analytical data see Table 1) were added in portions, with stirring, over a period of about 1 h at a temperature of 45° C. The mixture was then dispersed at 45° C. for 0.5 h at 800 rpm, and then stirred for a further 30 min in vacuo at 45° C. and 800 rpm. This gave a cloudy gel, analytical data for which are collated in Table 2.

Example 8 (E8)

360 g of polypropylene glycol monobutyl ether with average molar mass Mn 2300 g/mol (obtainable as polyglycol B01/240 from Clariant) wore used as initial charge in a laboratory mixer from PC Laborsystem GmbH with paddle dissolver (dissolver disc diameter 60 mm), and 36 g of HDK® H18 hydrophobic fumed silica (obtainable from backer Chemie AG; for analytical data see Table 1) were added in portions, with stirring, over a period of about 1 h at a temperature of 45° C. The mixture was then dispersed at 45° C. for 0.5 h at 800 rpm, and then, stirred for a further 30 min in vacuo at 45° C. and 800 rpm. This gave a transparent gel, analytical data for which are collated in Table 2.

Example 9 (E9; Not According to the Invention)

360 g of polyethylene glycol with average molar mass Mn 400 g/mol (PEG 400) were used as initial charge in a laboratory mixer from PC Laborsystem GmbH with paddle dissolver (dissolver disc diameter 60 mm), and 17.0 g of HBK® H18 hydrophobic fumed silica (obtainable from Wacker Chemie AG; for analytical data see Table 1) were added in portions, with stirring, over a period of about 1 h at a temperature of 45° C. The mixture was then dispersed at 45° C. for 0.5 h at 800 rpm, and then stirred for a further 30 min in vacuo at 45° C. and 800 rpm. This gave a clear, soft gel, analytical data for which are collated in Table 2.

TABLE 1

|  | HDK® H18 | HDK® H30RM | HDK® N20 |
|---|---|---|---|
| Methanl number | 74 | 72.5 | 0 |
| % carbon | 4.8 | 3.8 | n.d. |
| BET surface area ($m^2/g$) | n.d. | n.d. | 201 |
| DBP number (g/100 g) | 165 | 199 | 250 |
| Residual $S_iOH$ ($nm^{-1}$) | 0.36 | 0.27 | 1.85 |

TABLE 2

|  | Example E1 | Example E2 | Example E3 | Example E4 | Example E5 | Example E6 | Example E7 | Example E8 | Example E9 |
|---|---|---|---|---|---|---|---|---|---|
| Proportion pRA (%) | 9.0 | 11.0 | 16.3 | 9.0 | 9.0 | 20.0 | 9.0 | 9.0 | 4.5 |
| Viscosity at 1 $s^{-1}$ (Pas) at 25° C. | 419 | 365 | 368 | 523 | 437 | 980 | 380 | 289 | 76 |
| Viscosity at 100 $s^{-1}$ (Pas) at 25° C. | 15 | 12 | 17 | 18 | 13 | 36 | 17 | 12 | 2.6 |
| $R^{80}$ (1000; 0.01) (s) | 10.0 | 5.5 | 34.1 | 27.0 | 6.5 | 7.3 | 4.1 | 5.7 | 7.5 |
| $\overline{(d\eta/dt)_1/(d\eta/dt)_3}$ | 3.1 | 2.3 | 4.8 | 6.1 | 3.5 | 3.6 | 3.1 | 3.3 | 7.1 |
| G' (Pa) at 25° C. | 33500 | 53510 | 26300 | 32600 | 26043 | 25200 | 29415 | 31500 | 2028 |

TABLE 2-continued

|  | Example E1 | Example E2 | Example E3 | Example E4 | Example E5 | Example E6 | Example E7 | Example E8 | Example E9 |
|---|---|---|---|---|---|---|---|---|---|
| tan δ (25° C.) | 0.0717 | 0.077 | 0.17 | 0.0977 | 0.096 | 0.0774 | 0.0773 | 0.083 | 0.069 |
| $\tau_{crit}$ (Pa) at 25° C. | 220 | 110 | 31 | 170 | 232 | 40 | 199 | 98 | 39 |
| tan δ (75° C.) | 0.079 | 0.067 | 0.5 | 0.085 | 0.084 | 0.0705 | 0.0716 | 0.097 | n.d. |
| G' (Pa) at 75° C. | 10764 | 11580 | 10046 | 10538 | 10167 | 10095 | 11002 | 10970 | n.d. |

Jetting Example J1

Figure 2:
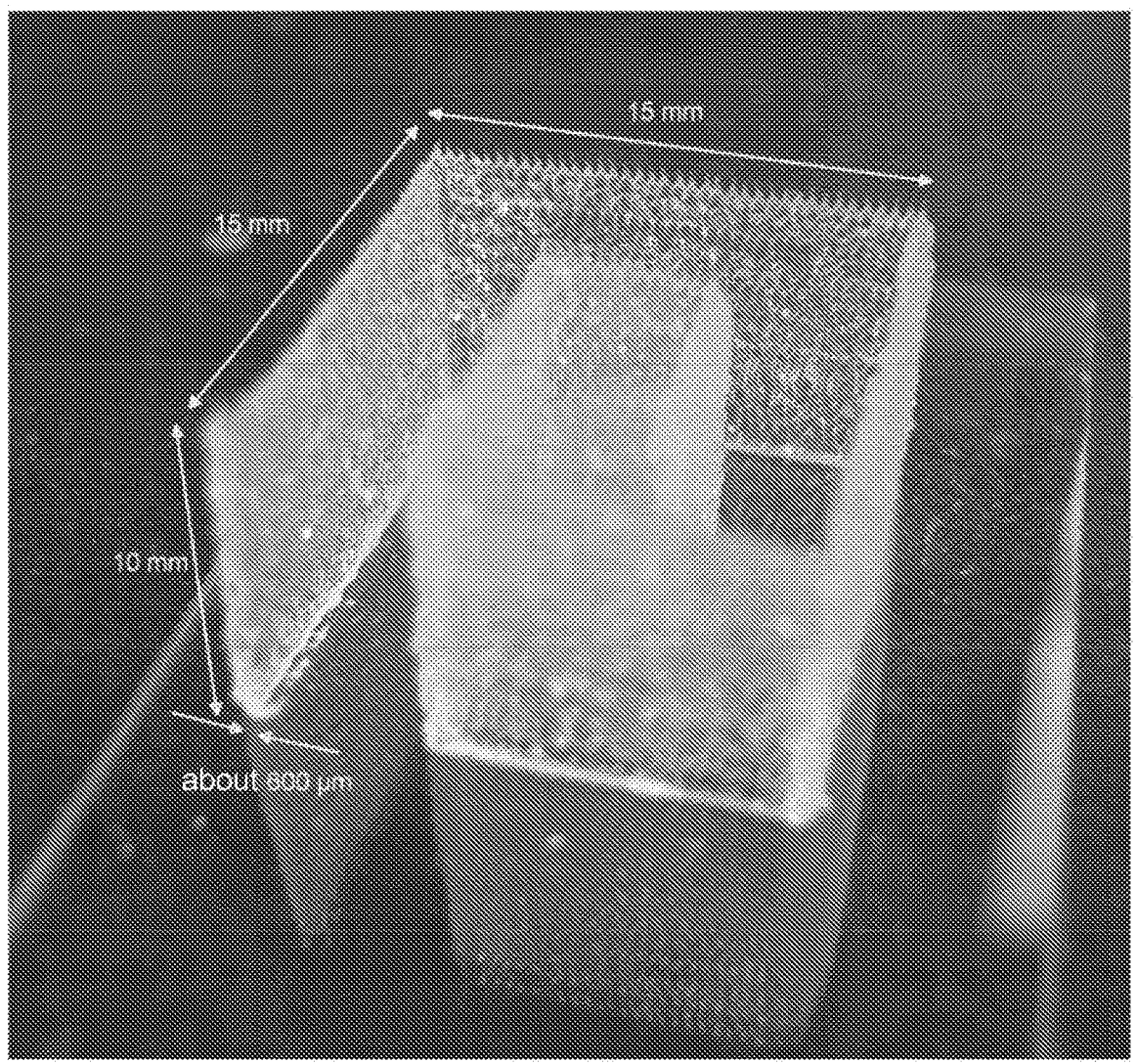
FIG. 2 illustrates one embodiment of an inventive molding.

Using the jetting nozzle parameters given, in Table 3, E1 was deposited, in droplet form on a glass sample slide of area 25×75 mm to give a rectangular spiral with wall thickness 600 μm and edge length 15 mm and height 10 mm. The high storage modulus and the yield point of the sm composition (6a) can give excellent dimensional stability of the deposited shape. A transparent stable gel structure was obtained (cf. FIG. 2).

Jetting Example J2

Using the jetting nozzle parameters given in Table 3, E2 was deposited. A transparent stable gel structure was obtained in a manner similar to J1.

Jetting-Example J3

Using the jetting nozzle parameters given in Table 3, E3 was deposited, h transparent stable gel structure was obtained in a manner similar to J1.

Jetting-Example J4

Using the jetting nozzle parameters given in Table 3, E4 was deposited. A transparent stable gel structure was obtained in a manner similar to J1.

Jetting-Example J5

Using the jetting nozzle parameters given in Table 3, E5 was deposited, A transparent stable gel structure was obtained in a manner similar to J1.

Jetting Example J6

Using the jetting nozzle parameters given in Table 3, E6 was deposited. A transparent stable gel structure was obtained in a manner similar to J1.

Jetting-Example J7

Using the jetting nozzle parameters given in Table 3, E8 was deposited, A transparent stable gel structure was obtained, in a manner similar to J1.

Jetting Example J8 (Not According to the Invention)

Figure 3:
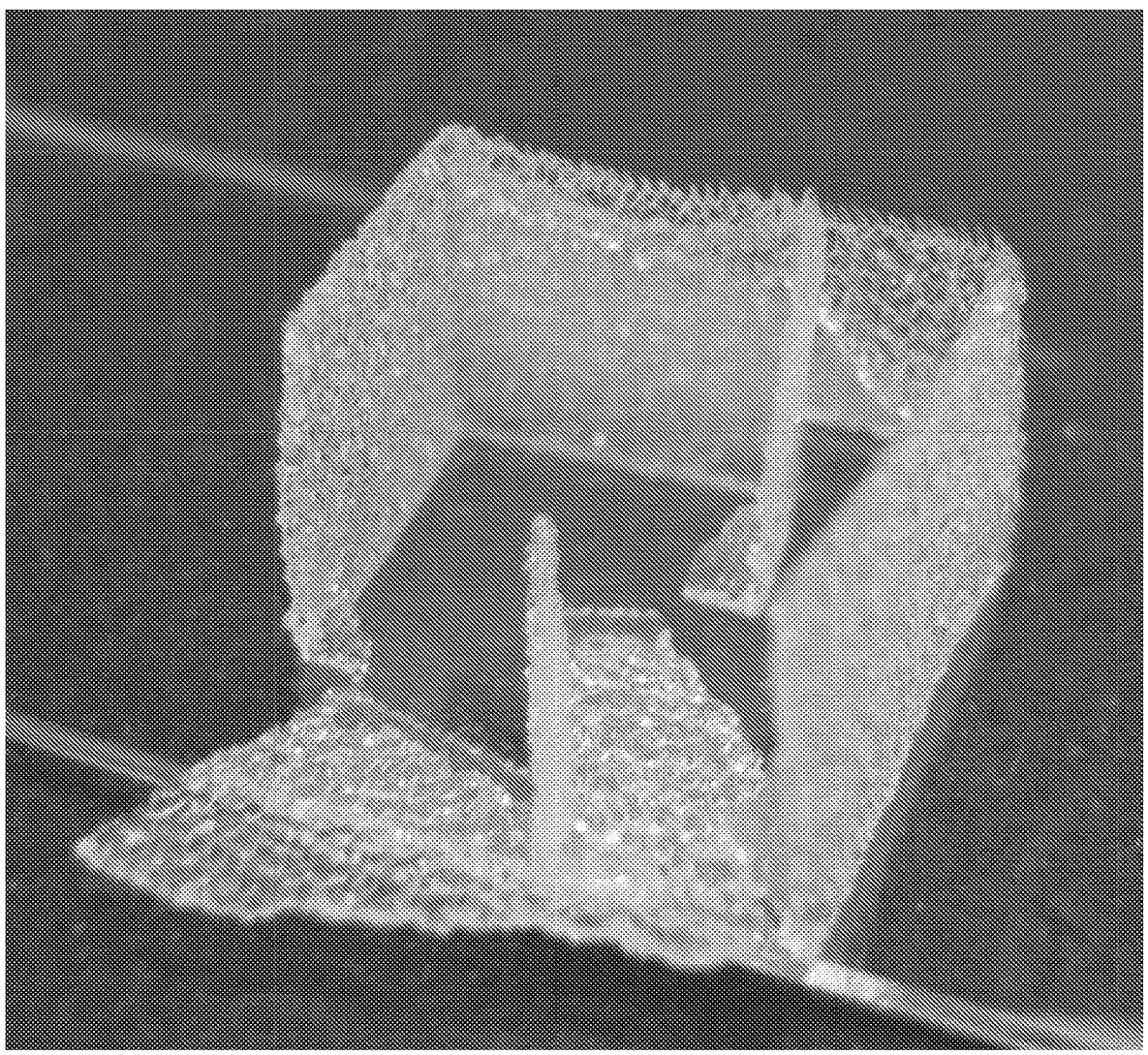
FIG. 3 illustrates a prior art gel structure.

Using the jetting nozzle parameters given in Table 3, E9 was deposited. A transparent labile gel structure was obtained (cf. FIG. 3).

Jetting Example J9

Figure 4:
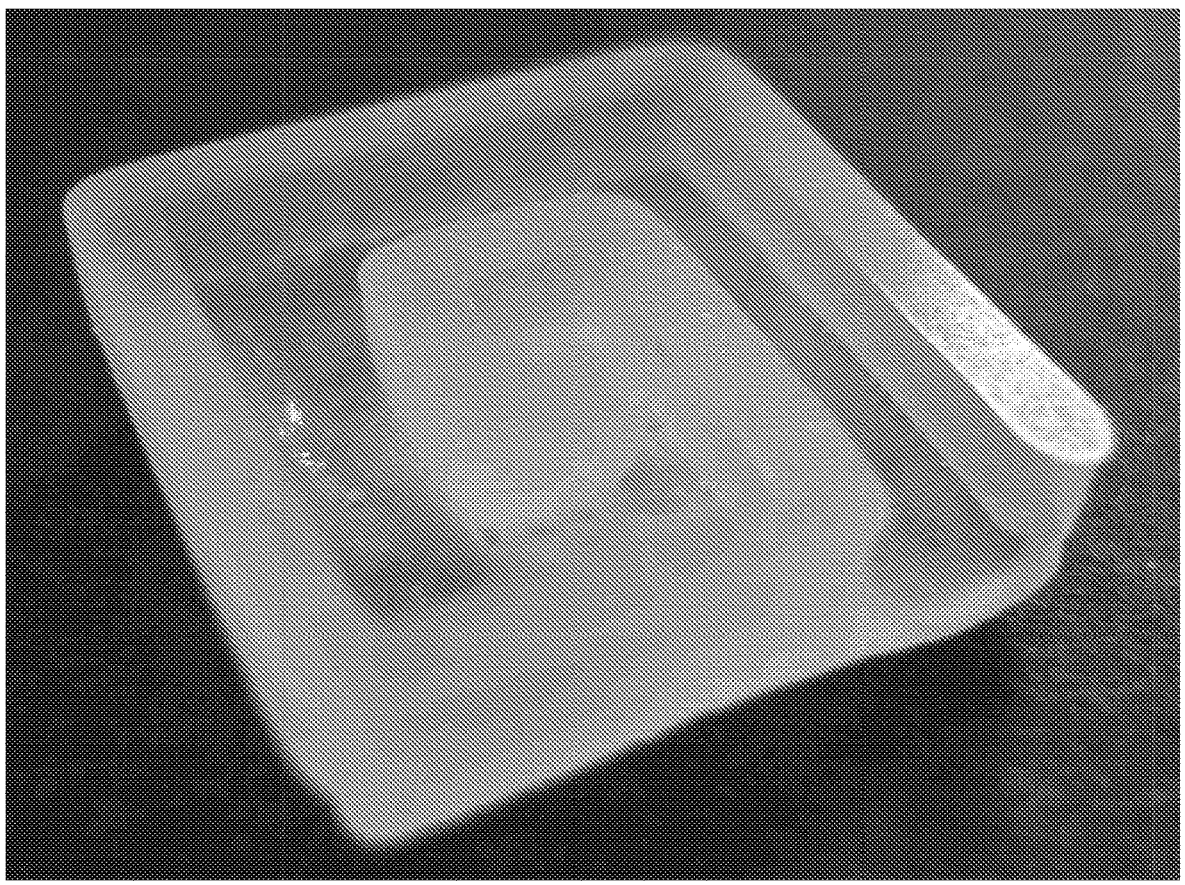
FIG. 4 illustrates another embodiment of an inventive molding.

Using the jetting nozzle parameters given in Table 3, SEMICOSIL® 810 UV 1K, a UV-light-induced-addition-crosslinking, translucent silicon rubber composition with viscosity about 310 000 mPa·s (at 0.5 s$^{-1}$) and Shore A vulcanisate hardness 40 (obtainable from WACKER CHEMIE AG) was deposited in droplet form on a glass sample slide of area 25×75 mm to give a rectangular spiral with wall thickness 2 mm and edge length 15 mm and height 3.5 mm. The spiral was crosslinked in the off-line UV chamber described above in accordance with the crosslinking parameters mentioned in that section. After cleaning of the nozzle head and, respectively, the supply lines and replacement of the cartridge, supportive material E7 was then jetted into the cavity of the spiral (see Table 4 for jetting nozzle parameters). After further cleaning of the nozzle head and, respectively, the supply lines and replacement of the S-M cartridge by a SEMICOSIL® 810 UV 1K cartridge, a cover of thickness 1.5 mm was printed onto the spiral, crosslinking was carried out as described above and water was used for washing to remove the supportive material. FIG. 4 shows the moulding obtained.

TABLE 3

|  | Example J1 | Example J2 | Example J3 | Example J4 | Example J5 | Example J6 | Example J7 | Example J8 |
|---|---|---|---|---|---|---|---|---|
| Nozzle diameter (μm) | 200 | 200 | 200 | 200 | 200 | 200 | 200 | 200 |
| Rising (ms): | 0.3 | 0.3 | 0.3 | 0.3 | 0.3 | 0.3 | 0.3 | 0.3 |
| Falling (ms): | 0.5 | 0.5 | 0.5 | 0.45 | 0.3 | 0.5 | 0.5 | 0.4 |
| Open Time (ms): | 15 | 1 | 5 | 15 | 5 | 1 | 15 | 1 |
| Needle Lift (%): | 100 | 95 | 95 | 100 | 95 | 95 | 100 | 100 |
| Delay (ms): | 25 | 25 | 25 | 25 | 25 | 25 | 25 | 25 |
| Heating (° C.): | 50 | 55 | 55 | 55 | 55 | 55 | 50 | Off |
| Cartridge admission pressure (bar) | 2 | 3 | 3 | 5 | 3 | 5 | 2 | 2 |
| Voxel diameter (μm) | 800 | 700 | 700 | 500 | 700 | 700 | 800 | 800 |

TABLE 4

|  | Example J9 Silicone composition | Example J9 Supportive material E8 |
|---|---|---|
| Nozzle diameter (μm) | 200 | 200 |
| Rising (ms): | 0.3 | 0.3 |
| Falling (ms): | 0.1 | 0.5 |
| Open Time (ms): | 15 | 1 |
| Needle Lift (%): | 1 | 95 |
| Delay (ms) | 25 | 25 |
| Heating (° C.): | 40 | 55 |
| Cartridge admission pressure (bar) | 3.0 bar | 5 |
| Voxel diameter (μm) | 700 | 700 |

The invention claimed is:

1. A process for additive manufacturing of mouldings via site-specific delivery of a structure-forming material, comprising:

delivering simultaneously or at staggered intervals at least one supportive material into regions which are to remain free from structure-forming material, where the delivery of the supportive material is achieved by way of a device which has at least one delivery unit for the supportive material, where the delivery unit can be positioned in x-, y- and z-directions with a precision of at least ±100 μm, and the site-specific delivery of the supportive material not only in the x, y-operating plane, but also in the z-direction, successively constructs a supportive structure made of supportive material for the moulding, wherein the supportive material is a pseudoplastic, viscoelastic composition comprising A) at least one polyether and
B) at least one particulate rheological additive, and
C) optionally further substances, the supportive material has a shear viscosity of at most 100 Pas measured at 25° C. with shear rate 100 $s^{-1}$, a structural relaxation parameter of at least 1 s, and a storage modulus G' of at least $5\times10^3$ Pa, and once the manufacturing of the moulding has been concluded, removing the supportive material from the moulding, where the shear viscosity of the supportive material is determined from a stepped profile, where the sample is sheared at a constant shear rate of 1 $s^{-1}$, 10 $s^{-1}$ and 100 $s^{-1}$ in each case for 120 s, with a measurement point duration of 12 s at 1 $s^{-1}$ and 10 s at 10 $s^{-1}$ and 100 $s^{-1}$, and the average of the final 4 data points of a measurement block is taken to give the shear viscosity.

2. The process of claim 1, wherein the particulate rheological additive B) comprises at least one hydrophobic silica with a silanol group density, determined by means of acid-base titration, of less than 1.8 silanol groups per $nm^2$.

3. The process of claim 1, wherein the particulate rheological additive B) comprises at least one hydrophobic silica with a methanol number of at least 30.

4. The process of claim 2, wherein the particulate rheological additive B) comprises at least one hydrophobic silica with a methanol number of at least 30.

5. The process of claim 1, wherein the supportive material of the moulding (8) is removed mechanically or via dissolution in a solvent.

6. The process of claim 2, wherein the supportive material of the moulding (8) is removed mechanically or via dissolution in a solvent.

7. The process of claim 3, wherein the supportive material of the moulding (8) is removed mechanically or via dissolution in a solvent.

8. The process of claim 4, wherein the supportive material of the moulding (8) is removed mechanically or via dissolution in a solvent.

9. The process of claim 1, wherein the supportive material is removed by dissolution in water.

10. The process of claim 1, wherein the supportive material is a gel which is liquefiable under shear at 25° C.

* * * * *